(12) United States Patent
Cook et al.

(10) Patent No.: US 6,175,750 B1
(45) Date of Patent: Jan. 16, 2001

(54) SYSTEM AND METHOD FOR CALIBRATING A REFLECTION IMAGING SPECTROPHOTOMETER

(75) Inventors: Christopher A. Cook, Philadelphia, PA (US); Warren Groner, Great Neck, NY (US); Richard G. Nadeau, North East, MD (US)

(73) Assignee: Cytometrics, Inc., Philadelphia, PA (US)

( * ) Notice: Under 35 U.S.C. 154(b), the term of this patent shall be extended for 0 days.

(21) Appl. No.: 09/271,993

(22) Filed: Mar. 19, 1999

(51) Int. Cl.[7] .............................. A61B 5/00; G01D 18/00
(52) U.S. Cl. ..................... 600/310; 600/475; 600/477; 250/252.1; 356/243
(58) Field of Search ............................ 600/310, 322, 600/323, 331, 473, 475, 476, 477; 250/252.1; 356/364, 243; 382/128, 134, 274

(56) References Cited

U.S. PATENT DOCUMENTS

| 5,321,970 | 6/1994 | Davies et al. |
|---|---|---|
| 5,565,678 | * 10/1996 | Manian ............................... 250/252.1 |
| 5,592,290 | * 1/1997 | Arai et al. ............................ 356/243 |
| 5,838,435 | 11/1998 | Sandison . |
| 5,905,808 | * 5/1999 | Shen et al. ........................ 250/252.1 |

FOREIGN PATENT DOCUMENTS

| 0 444 689 A2 | 2/1991 | (EP) . |
|---|---|---|
| 0 529 530 A2 | 8/1992 | (EP) . |
| 0 570 003 A2 | 5/1993 | (EP) . |

* cited by examiner

Primary Examiner—Eric F. Winakur
(74) Attorney, Agent, or Firm—Sterne Kessler Goldstein & Fox, P.L.L.C.

(57) ABSTRACT

The invention comprises a system and method of calibrating a reflected spectral imaging apparatus used for analysis of living tissue. In addition to the reflected spectral imaging apparatus itself, the calibration apparatus comprises an optical filter that is placed between the light source used in the imaging apparatus and the object under analysis, and a calibration module. The filter is fabricated such that when the light is passed through the filter, an image is projected onto the focal plane where imaging is to take place within the object. The image projected by the filter comprises a plurality of areas, each having a different known optical density. For each area, the calibration module measures the intensity of the light reflected from the area and maps the light intensity measurement to the optical density known to be present at the area. This correspondence of light intensity measurements and known optical densities is then used to calibrate the reflected spectral imaging apparatus.

19 Claims, 5 Drawing Sheets

SYSTEM AND METHOD FOR CALIBRATING A REFLECTION IMAGING SPECTROPHOTOMETER

CROSS-REFERENCE TO RELATED APPLICATION

This application is related to commonly assigned U.S. patent application Ser. No. 08/860,363, filed Jun. 5, 1997, titled "Method and Apparatus for Reflected Image Analysis" by W. Groner and R. Nadeau, and which is incorporated herein by reference in its entirety.

BACKGROUND OF THE INVENTION

1. Field of the Invention

The present invention is related to reflected light analysis. More particularly, the present invention is related to calibration of a reflection imaging spectrophotometer.

2. Related Art

Quantitative spectrophotometry requires a means for calibrating the detection subsystem of the spectrophotometer and for verification of the calibration. One approach to calibration involves the insertion of two or more standards of known reflectance in the measurement path and measuring the resultant detected signals from each. These standards may include, for example, a blank (i.e., a standard with zero absorption and full reflectance) plus one or more standards having other known optical densities.

Such an approach is complicated by the fact that the nature of the reflecting surface may influence the result. Thus, a standard reflecting surface is typically needed in addition to the optical density calibration standards themselves. Transfer of calibration from one reflecting surface to another, however, is not generally possible. A reflection imaging spectrophotometer that is calibrated with respect to one reflecting surface will not necessarily be calibrated correctly with respect to another reflecting surface. Hence a reflection imaging spectrophotometer that is calibrated with respect to some standard reflecting surface will not necessarily be calibrated correctly with respect to an actual subject. Moreover, control of the reflecting surface is not possible when performing reflection imaging spectrophotometry of living human tissue. A method is therefore needed to provide standards for calibration of reflection imaging spectrophotometers intended for such applications.

SUMMARY OF THE INVENTION

The invention comprises a system and method for calibrating a reflected spectral imaging apparatus, such as a reflection imaging spectrophotometer, used for analysis of living tissue. In addition to the reflected spectral imaging apparatus itself, the calibration apparatus includes an optical filter that is placed between the light source used in the imaging apparatus and the object under analysis, and a calibration module. The filter is fabricated such that when the light is passed through the filter, an image is projected onto the focal plane where imaging is to take place within the object. The image projected by the filter comprises a plurality of areas, each having a different known optical density. For each area, the calibration module measures the intensity of the light reflected from the area. The calibration module then maps the area's light intensity measurement to the optical density known to be present at the area. This correspondence of multiple light intensity measurements with known optical densities is used to calibrate the reflected spectral imaging apparatus.

FEATURES AND ADVANTAGES

It is a feature of the present invention that it provides for calibration of a reflection imaging spectrophotometer in a manner that takes into account the nature of the reflecting surface of the specific object being imaged. Hence calibration of the spectrophotometer, when performed according to the invention, is adapted to the object being imaged.

Because the calibration takes into account the nature of the reflecting surface of the specific object being imaged, it is an advantage of the invention that the calibration is adaptable to subsequent objects that may be imaged. The invention permits ready recalibration of the spectrophotometer.

It is a further advantage of the invention that calibration of the spectrophotometer is performed in a non-invasive manner with respect to the object being imaged. As a consequence, the object being imaged suffers no damage during the calibration process.

Because the calibration is non-invasive, it is a further advantage of the invention that, when imaging human tissue in vivo, no discomfort is caused in the patient by the calibration process.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

I. Overview

A. Present invention

The present invention represents a system and method for calibrating a reflected spectral imaging apparatus, such as a reflection imaging spectrophotometer. Calibration is performed by inserting an optical filter into the light path of the spectrophotometer between the light source and the object being imaged. The filter is comprised of multiple areas which project corresponding areas on a focal plane at the object. The filter is fabricated such that the areas projected on the focal plane have different, known optical densities. The intensity of light returned from each of these areas is measured. The correspondence between the measured light intensity and the known optical density at each area is then used to calibrate the spectrophotometer.

This calibration technique is particularly well-suited to reflection imaging spectrophotometry of living tissue. Calibration of a spectrophotometer requires the use of two or more optical density standards as well as a standard reflecting surface, as discussed above. The use of physical standards is not feasible when imaging living tissue below the surface. Insertion of such standards at the point where imaging is to take place would likely damage the tissue and, in the case of human tissue, injure the patient. Nor is control of the reflecting surface feasible in the case of living tissue. The present invention provides for calibration by using optically projected standards rather than physical ones, so that calibration of the spectrophotometer may be performed non-invasively, like the imaging process itself. Moreover, the standard reflecting surface is that of the actual surface being imaged, so that the use of a separate standard reflecting surface is not necessary.

B. Reflection image spectrophotometry

In general terms, a reflection image spectrophotometer is a non-invasive apparatus for analyzing physical matter. The spectrophotometer comprises means for illumination of an object to be imaged, such as a region of living human tissue, and for analysis of the light that is returned. Light which is returned from the object will have been affected by its interaction with the object. Depending on the properties of the object, certain frequencies of the light will have been absorbed or attenuated. By precisely analyzing the properties of the returned light, inferences can be made as to the properties of the object without having to perform invasive inspection.

1. Apparatus

Figure 1:
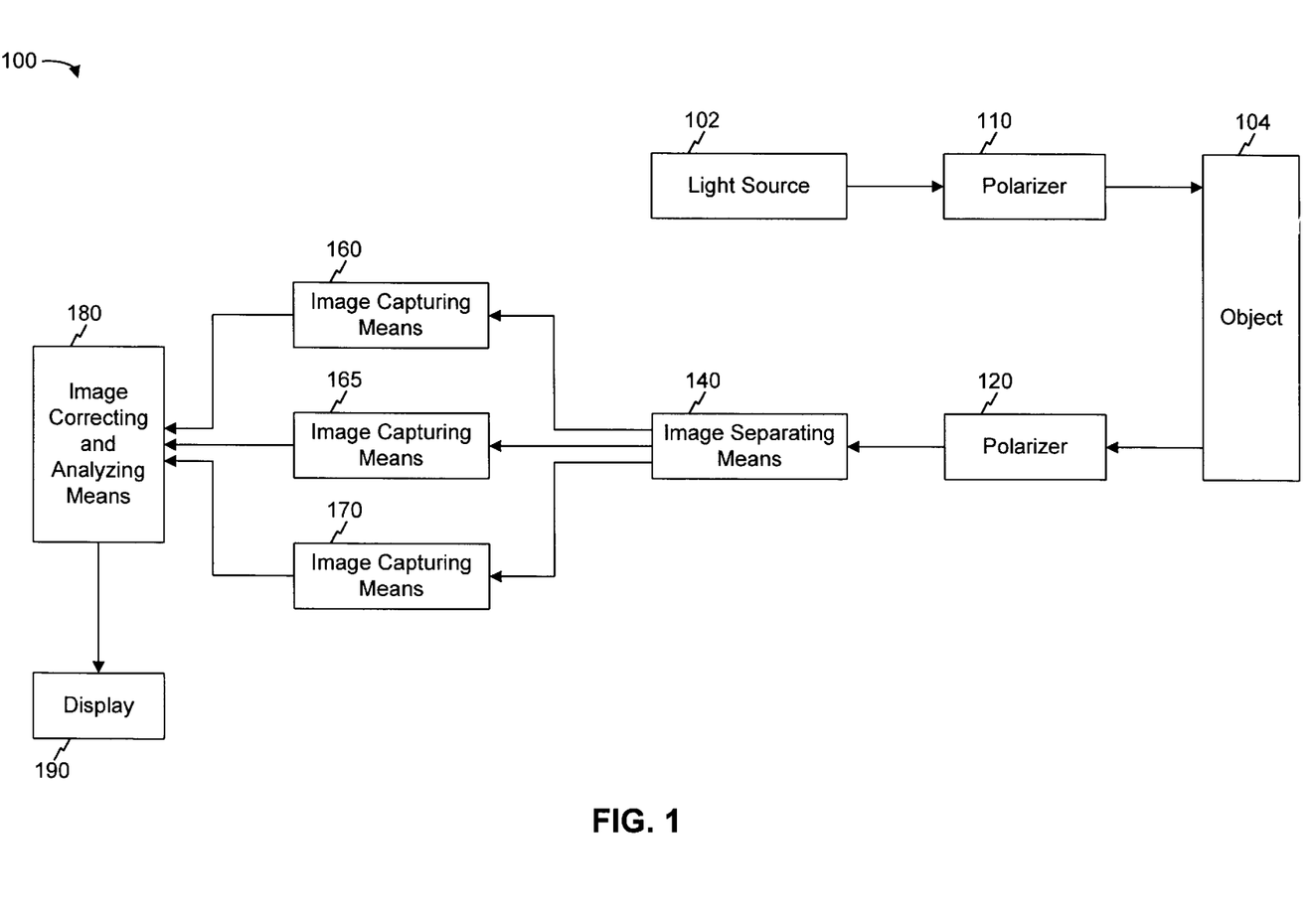
FIG. 1 is a block diagram depicting the general structure and operation of an embodiment of a reflection imaging spectrophotometer.

FIG. 1 shows a block diagram illustrating one embodiment of a reflection image spectrophotometer used for non-invasive analysis of an object. Apparatus 100 includes a light source 102 for illuminating an object under analysis, shown generally at 104. Although one light source is shown, it is to be understood that the present invention is not limited to the use of one light source, and more than one light source can be used. Where more than one light source is used, each light source can be monochromatic or polychromatic. Light source 102 can be a light capable of being pulsed, or a non-pulsed light source providing continuous light, or one capable of either type of operation. Light source 102, can include, for example, a pulsed xenon arc light, a mercury arc light, a halogen light, a tungsten light, a laser, a laser diode, or a light emitting diode (LED). Light source 102 can be a source for coherent light, or a source for incoherent light.

A first polarizer 110 is placed between light source 102 and object under analysis 104. A second polarizer or analyzer 120 is placed in the reflected light path between object 104 and an image separating means 140. Polarizers 110 and 120 preferably have planes of polarization oriented 90° relative to each other.

In one embodiment of a reflection imaging spectrophotometer, the light source and first polarizer may be combined so that a separate first polarizer 110 is not required. In such an embodiment, light source 102 is a source of polarized light, for example, a laser or a laser diode, and second polarizer 120 has a plane of polarization oriented 90° relative to the plane of polarization of polarized light source 102.

The output from the second polarizer 120, a polarized reflected image, is connected to image separating means 140, which separates the image into two or more image portions. Each image portion is routed to an image capturing means, such as image capturing means 160, 170, and 165. The output of each image capturing means is coupled to an image correcting and analyzing means 180. The output of the image correcting and analyzing means 180 is connected to a display 190.

Figure 2:
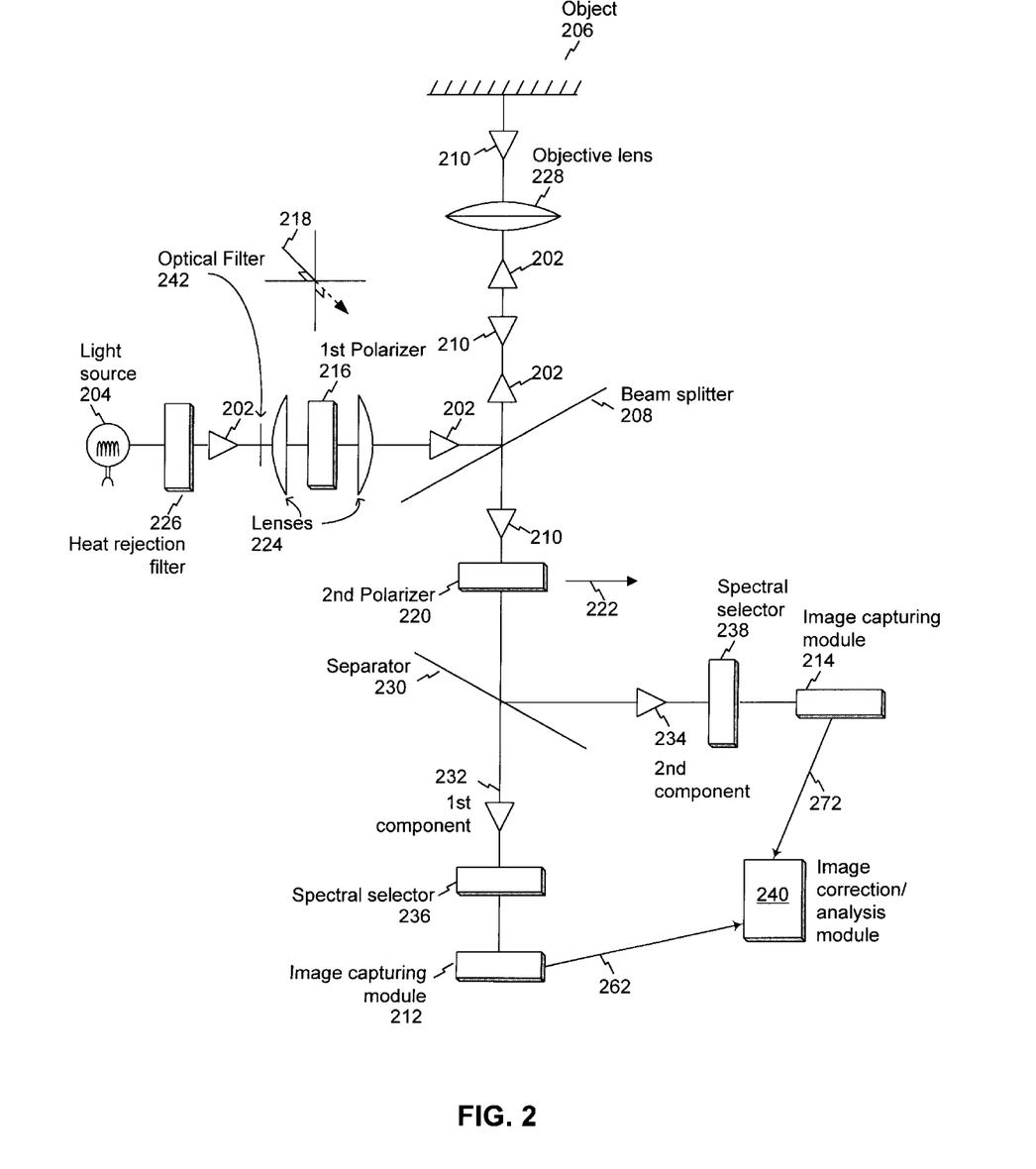
FIG. 2 is a more detailed diagram depicting the structure and operation of an embodiment of a reflection imaging spectrophotometer that includes an optical filter used for calibration purposes, according to an embodiment of the invention.

A more detailed illustration of such a reflection image spectrophotometer is presented in FIG. 2. A light path 202 is formed between a light source 204 and an object 206 to be analyzed (such as living tissue), as directed by a beam splitter 208. A reflected light path 210 proceeds from object 206 to image capturing modules 212 and 214. Suitable image capturing means include, but are not limited to, a camera, a film medium, a charge coupled device (CCD) camera, or a complementary metallic oxide semiconductor (CMOS) camera.

A first polarizer 216 is placed in light path 202 between light source 204 and object 206. First polarizer 216 has a plane of polarization indicated generally by an arrow 218 which is shown pointing into the plane of the figure. A second polarizer or analyzer 220 is placed in reflected light path 210 between object 206 and image capturing modules 212 and 214. Second polarizer 220 has a plane of polarization shown generally at 222. As shown in FIG. 2, planes of polarization 218 and 222 are oriented 90° relative to each other. Polarizers, such as polarizers 216 and 220, having planes of polarization oriented 90° relative to each other, are referred to herein as "cross-polarizers".

Focusing lenses 224 can be placed on either side of first polarizer 216. A heat rejection filter 226 is preferably placed in front of light source 204. An objective lens 228 is placed co-axially in light path 202 and reflected light path 210. Image capturing modules 212 and 214 are located in magnified image planes of objective lens 228.

An image separator 230 is placed in reflected light path 210 between second polarizer 220 and image capturing means 212, for separating the reflected image into a first portion 232 and a second portion 234. It is to be understood that image separator 230 can separate the reflected image into a plurality of portions, and is not limited to two portions. First portion 232 of the reflected image is routed to first image capturing module 212. Second portion 234 is routed to second image capturing module 214. Second image capturing module 214 can be the same type of device as image capturing module 212 or it can be different. In alternative embodiments, additional image capturing modules can be used to capture further image portions separated by image separating module 230. Alternatively, a single image capturing module can be used to capture both first portion 232 and second portion 234 of the reflected image.

A spectral selector 236 can be placed in reflected light path 210 between second polarizer 220 and image capturing means 212. Spectral selector 236 can be, for example, a monochromator, a spectral filter, prism, or grating. Similarly, a spectral selector 238 can be placed in reflected light path 210 between second polarizer 220 and second image capturing module 214. Spectral selector 238 can likewise be, for example, a monochromator, a spectral filter, prism, or grating. The center values for spectral selectors 236 and 238 can be chosen based upon the type of analysis to be conducted.

Image capturing module 212 is coupled to an image correcting and analyzing module 240. Image correcting and analyzing module 240 can be a computer or other type of processing system (explained in more detail below with respect to FIG. 5). Similarly, image capturing module 214 is coupled to image correcting and analyzing module 240.

In an embodiment of the present invention, optical filter 242 is placed in the light path 202 between light source 204 and object 206 for purposes of calibration of the reflection image spectrophotometer, and will be discussed in greater detail below. The optical filter must be positioned in the path of the light, between the light source and the object under analysis. FIG. 2 depicts an embodiment of the invention where an optical filter 242 is placed between heat rejection filter 226 and lenses 224. In other embodiments of the invention, the filter may be placed elsewhere in the path between the light source and the object under analysis. The filter must, however, be placed so as to project a focused image within the object at the focal plane where imaging is to take place.

2. Operation

Operation of the illustrated reflection imaging spectrophotometer begins with the imaging of an object to produce a raw reflected image. Light originating from light source 204 first travels along path 202, where it passes through heat rejection filter 226. The purpose of heat rejection filter 226 is to block out infrared wavelengths. In the depicted embodiment, the light then passes through optical filter 242 so as to project an image, for purposes of calibration of the spectrophotometer, on the object under analysis 206. The use of this image for calibration is described below in section VI.

The light from light source 204 then passes through focusing lenses 224 and first polarizer 216. The light is polarized in a first direction 218 by polarizer 216. Polarized light from light source 204 is then directed by beam splitter 208 through objective lens 228, towards object 206. The light then impinges on and is reflected from object 206 in direction 210. When using the apparatus to image human vascular tissue, the tissue covering the imaged portion should be transparent and must be traversed by light to obtain a reflected image without multiple scattering. The reflected image is essentially from a single scattering of the reflected light. In this manner, light from light source 204 penetrates the mucosal membrane to produce a raw reflected image of the microvascular system. The reflected image is reflected from a depth less than the multiple scattering length, then passes through objective lens 228, which magnifies the reflected image.

The reflected light contains both polarized and unpolarized components. The Rayleigh scattering component of the reflected light is unpolarized. The mirror reflection component and the rough surface scattering component retain the polarization from polarizer 216. When the reflected light passes through second polarizer 220, which is oriented in a direction 222 that is rotated 90° relative to first direction 218, the mirror reflection component and the rough surface component are extinguished. Therefore, the only component of reflected light that passes through second polarizer 220 is the unpolarized Rayleigh scattering component. Rayleigh scattering provides a virtual backlighting effect that significantly increases the contrast and visualization of reflected images, and better enables the performance of quantitative analyses using reflected images.

Image separator 230 is placed in reflected light path 210 after second polarizer 220 for separating the reflected image into a first portion 232 and a second portion 234. The portions 232 and 234 then pass through spectral selectors 236 and 238 respectively. First portion 232 of the reflected image is captured by first image capturing module 212. Second portion 234 is captured by second image capturing module 214.

Image capturing module 212 is coupled to an image correcting and analyzing module 240. A signal 262 representing the reflected image captured by image capturing module 212 is sent by image capturing module 212 and received by image correcting and analyzing module 240. Similarly, image capturing module 214 is coupled to image correcting and analyzing module 240. A signal 272 representing the reflected image captured by image capturing module 214 is sent by image capturing module 214 and received by image correcting and analyzing module 240. Image correcting and analyzing module 240 carries out the correction and analysis of the reflected image received, and can be a computer or other type of processing system (explained in more detail below with respect to FIG. 5). Image correcting and analyzing module 240 can be configured to carry out these steps through hardware, software, or a combination of hardware and software.

To perform image correction, image correcting and analyzing module 240 may, in an embodiment of the invention, apply a correction function to the raw reflected image to normalize it with respect to the background. For example, a poly-chromatic correction, such as a bi-chromatic correction, can be used to eliminate the effects of light intensity, depth, and angle of light from the corrected reflected image. A poly-chromatic correction can eliminate the effect of pigmentation of the tissue through which the light travels to illuminate the imaged portion of the vascular system. The tissue pigmentation will affect some wavelengths of light in the same manner, so that the tissue pigmentation effect is canceled out through use of a poly-chromatic correction. Alternatively, a velocity correction could be applied to extract moving cells from a stationary background. The velocity correction could be used alone, or in conjunction with, a polychromatic correction.

Image correcting and analyzing module 240 may also perform segmentation of an image. In such a process, a scene is segmented from the corrected reflected image to form an analysis image. The analysis image is formed so that it contains the subject matter needed for analyzing a characteristic of object 206. In the case of human vascular tissue, or example, the characteristic to be analyzed may be one for which large vessels should be analyzed, such as hemoglobin concentration per unit volume of blood, or the number of white blood cells per unit volume of blood. For these characteristics, the analysis image that contains large vessels is formed in part by the segmentation process. As another example, the characteristic to be analyzed may be one for which small vessels should be analyzed, such as the number of platelets per unit volume of blood, or the concentration per unit volume of blood of components in capillary plasma, such as bilirubin. For these characteristics, the analysis image that contains small vessels is formed.

In an alternate embodiment of a reflection imaging spectrophotometer, the scene can be segmented from the raw reflected image, and the scene then corrected to form the analysis image. The correction function may also be omitted entirely, so that the analysis image is formed from the raw reflected image.

Finally, image correcting and analyzing module 240 performs analysis of the analysis image with respect to one or more characteristics of the object 206.

C. Application of the present invention to reflection image spectrophotometry

The purpose of the present invention is to allow calibration of the spectrophotometer so that analysis may be performed accurately. The spectrophotometer must be able to determine the exact optical density at specific points of the object under examination. It is this determination that permits quantitative analysis of cellular and chemical components of the blood in vivo. Optical density, however, must be determined by measuring the intensity of light reflected from those points of the object under analysis. The light intensity measurement is used to the determine the optical density.

The correlation between measured light intensity and optical density, however, may differ from patient to patient and tissue to tissue. To make the proper correlation between a measured light intensity and an optical density for a given object under analysis, calibration of the spectrophotometer must first be performed. Such a calibration establishes the necessary correlation, i.e., the proper mapping between light intensity values and optical density values. The present invention provides a system and method for performing this mapping, by allowing the spectrophotometer to measure the light intensity emanating from areas of known optical density, i.e., the areas projected by the optical filter. Once intensity measurements are made and correlated to known optical densities at two or more points, then calibration can be performed.

II. Construction and placement of optical filter

Figure 3:
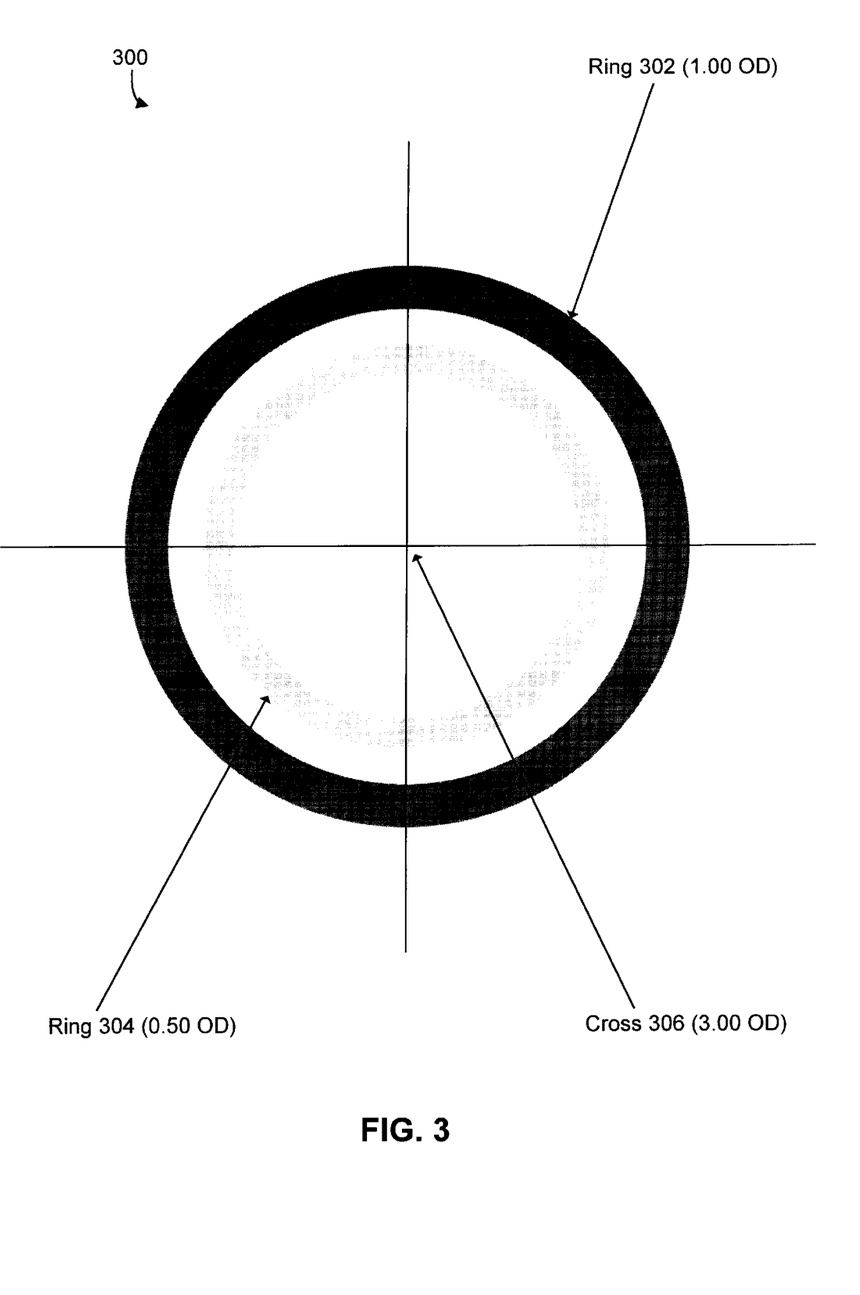
FIG. 3 is an illustration of an image projected onto a region of tissue by an exemplary optical filter, according to an embodiment of the invention.

An optical filter must first be created, one that will be used to project an image on a focal plane at the object under analysis. The filter must be constructed such that the image projected by passing light through the filter has two or more areas of different known optical densities. FIG. 3 is an illustration of an image 300 projected by an optical filter that has been constructed according to an embodiment of the invention. Image 300 comprises an annular ring 302, a smaller concentric ring 304, and a cross 306. The optical filter has been constructed so that ring 302 has an optical density of 1.00, ring 304 has an optical density of 0.50, and cross 306 has an optical density of 3.00. In alternative embodiments, the optical filter may be constructed so that the projected image contains areas having shapes and sizes other than what are portrayed in FIG. 3. In alternative embodiments, moreover, the projected areas may have optical densities other than those portrayed in FIG. 3. In any embodiment of the invention, however, the optical filter must be constructed so that projected areas of the image have two or more known optical densities. Construction of such a filter can be performed with conventional photolithographic techniques. Such techniques are well known to persons skilled in the relevant art. Moreover, optical filters similar to those described herein are readily available commercially.

Once created, the optical filter must be placed in the light path of the reflection image spectrophotometer in order to calibrate it. The optical filter must be positioned in the path of the light, between the light source and the object under analysis. FIG. 2 depicts an embodiment of the invention where optical filter 242 is placed between heat rejection filter 226 and lenses 224. In other embodiments of the invention, the filter may be placed elsewhere in the path between the light source and the object under analysis. The filter must, however, be placed so as to project a focused image within the object at the focal plane where imaging is to take place.

Note that in an embodiment of the invention, the optical filter is constructed so as to project an image that is optically neutral with respect to a plurality of wavelengths. The image from such a filter will thus be composed of areas, each with an optical density that is constant for all such wavelengths. This results in a projected image that can be used to calibrate each of the channels of a bi-chromatic or multispectral reflection image spectrophotometer whose light source produces these wavelengths.

Note also that if the optical filter is constructed so as to project a reticle-shaped image such as that in FIG. 3, the filter can serve a secondary purpose, apart from calibration. A well-defined image projected by such a filter can be used to align the images from two or more independent imaging channels. Such images may have been captured at different times, for example. This alignment is also known as registration. By registering the cross hairs on the respective independent images, precise superpositioning of such images is possible during analysis. Registration permits comparison of specific points or regions, so that differences or changes between the two images at those points may be identified. Moreover, in alternative embodiments of the invention, any filter may serve this purpose if its image is well defined and if it projects two or more reference points so as to allow registration of multiple images.

III. Measurement of intensity at projected areas

Referring again to FIG. 2, light originating from light source 204 returns from object 206 under analysis (such as tissue) to image capturing devices 212 and 214. The areas projected by optical filter 242 onto a focal plane of object 206 also return light to image capturing devices 212 and 214. The intensity of the light reflected from the projected areas is measured by image correction and analysis module 240. For purposes of calibration, these measurements will ultimately be mapped to the known optical density values of the projected areas.

IV. Mapping of measured intensities to optical densities

Calibration of the spectrophotometer requires that a plurality of measured light intensity values be correlated with known optical densities. Once the measured light intensity values are mapped to the corresponding optical densities, calibration may proceed.

For each area projected by an optical filter, the light intensity measured for that area is mapped to the optical density value known for that area. Referring to FIG. 3, the intensity of the light reflected from ring 302 is recorded. This intensity is then mapped to an optical density of 1.00. Similarly, the intensity of the light reflected from ring 304 is mapped to an optical density of 0.50, and the intensity of the light reflected from cross 306 is mapped to an optical density of 3.00.

V. Calibration

The associations between measured intensity values and known optical density values are then used to perform calibration. At this point, intensity measurements have been taken at areas of the object under analysis where an image has been projected by an optical filter. The various areas of the projected image have known optical densities. The image correction/analysis module 240, illustrated in FIG. 2, can now be calibrated, given that a plurality of intensity measurements are now known to correspond to specific optical densities.

VI. Calibration process summary

Figure 4:
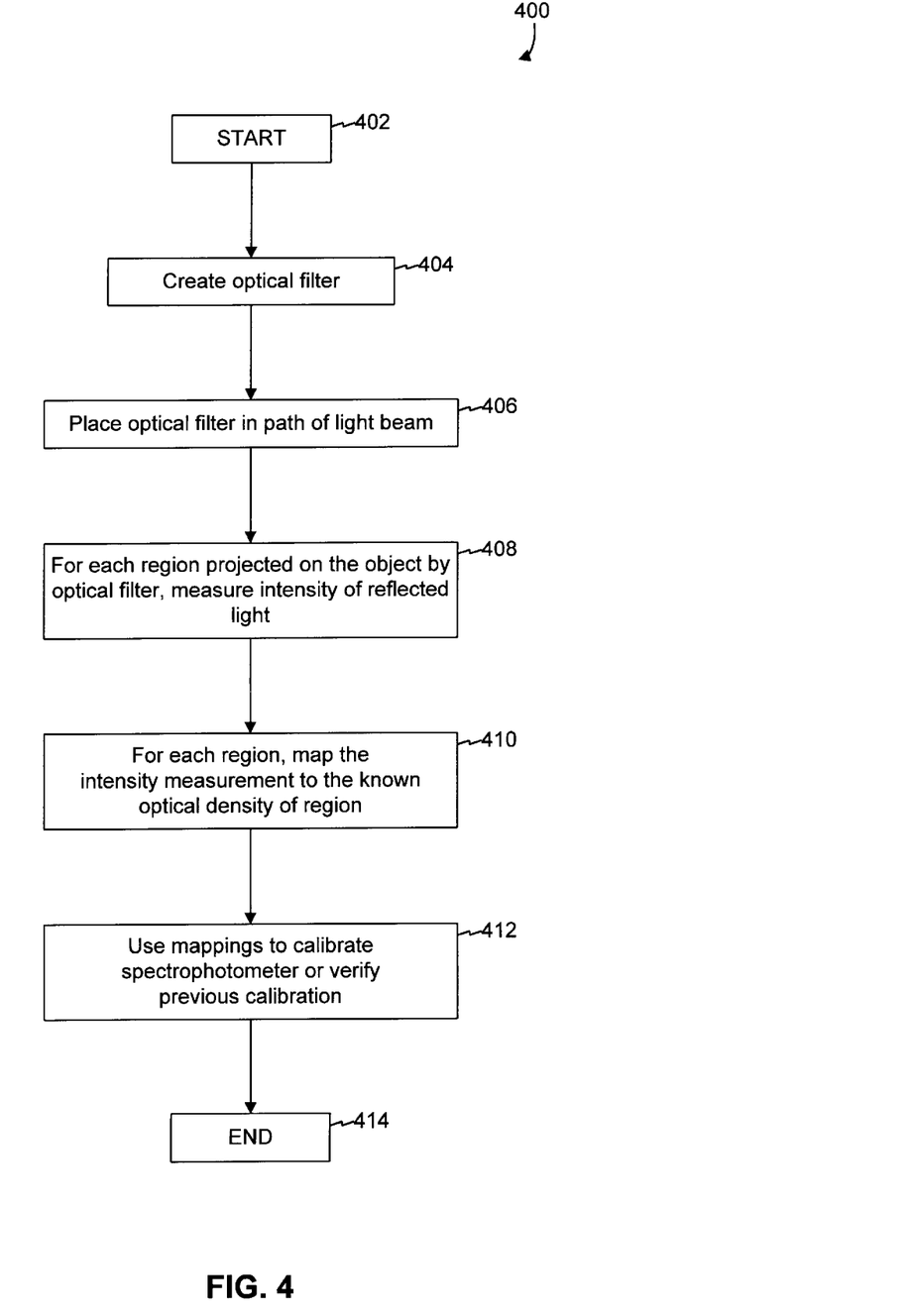
FIG. 4 is a flowchart illustrating the process of calibrating a reflection imaging spectrophotometer, according to an embodiment of the invention.

A summary of the calibration process according to an embodiment of the invention is illustrated in FIG. 4. In step 404 an optical filter is fabricated, having the properties described above in section II. Such a filter may be fabricated using known photolithographic methods that are well known to persons of ordinary skill in the relevant art. In step 406, the filter is placed in the light path between the illumination source and the object (such as tissue) under analysis. The filter must be positioned so as to project a focused image at the plane in the object where imaging is to take place. In step 408, for each area projected by the optical filter on to the object under analysis, the intensity of the light returned to the image correction and analysis module is measured. In step 410, for each area projected by an optical filter, the light intensity measured in step 408 for the area is mapped to the optical density known for that area. In step 412, the mapping established in step 410 is used to calibrate the image correction and analysis module of the spectrophotometer.

VII. Environment

The steps of optical filter creation (step 404), measurement of light intensity (step 408), mapping of measured light intensities to known optical densities (step 410), and use of this mapping for calibration (step 412) may be performed by hardware, software, human intervention, or some combination thereof.

Figure 5:
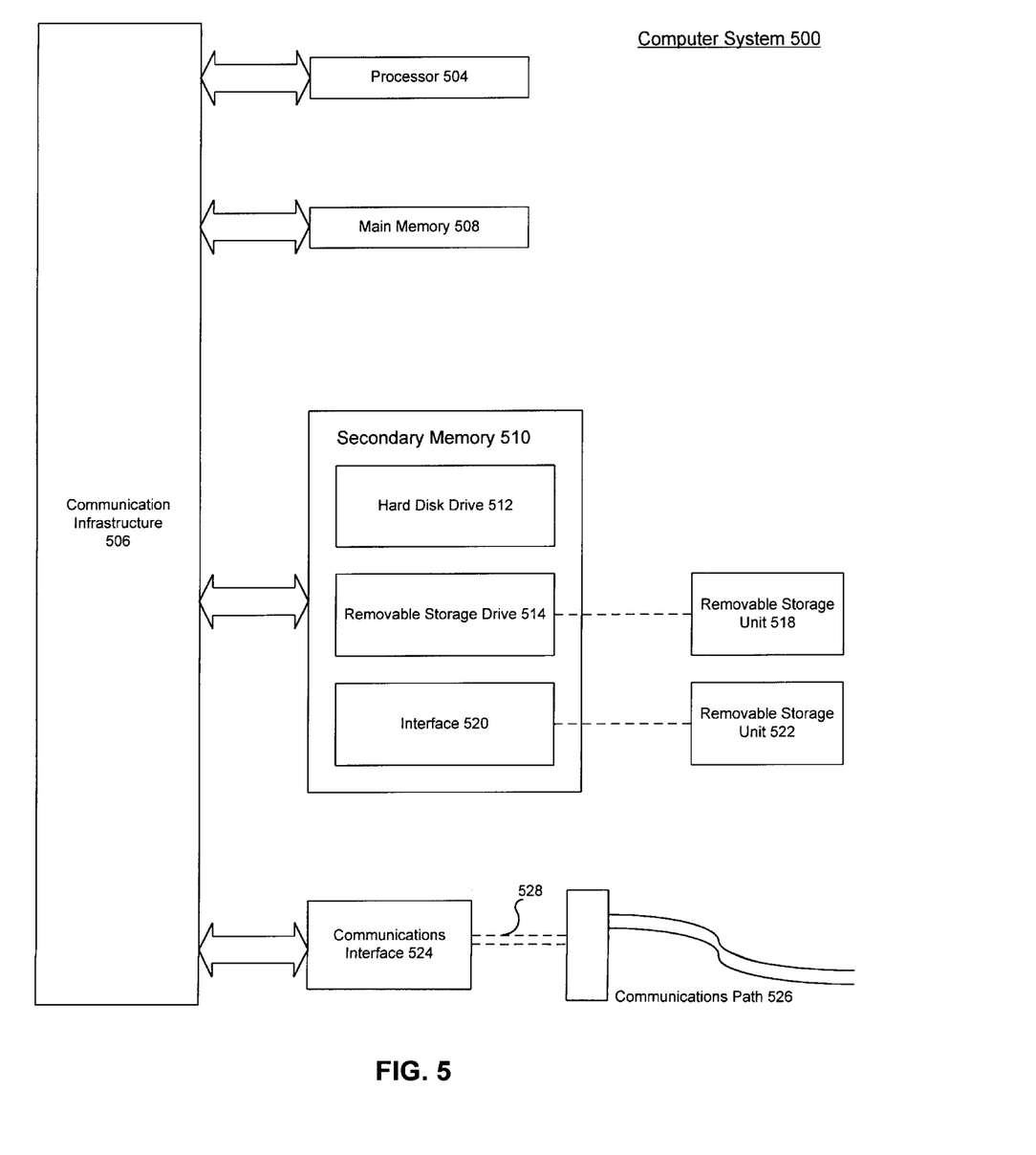
FIG. 5 illustrates a generic computer system which may be used to perform some of the operations required for calibration, according to an embodiment of the invention.

An exemplary computer system for performing any of these steps is shown as a computer system 500 in FIG. 5. Computer system 500 includes one or more processors, such as processor 504. Processor 504 is connected to a communication infrastructure 506. Various software embodiments are described in terms of this exemplary computer system. After reading this description, it will become apparent to a person skilled in the relevant art how to implement the invention using other computer systems and/or computer architectures.

Computer system 500 also includes a main memory 508, preferably random access memory (RAM), and can also include a secondary memory 510. Secondary memory 510 can include, for example, a hard disk drive 512 and/or a removable storage drive 514, representing a floppy disk drive, a magnetic tape drive, an optical disk drive, etc. Removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to computer system 500.

Computer system 500 can also include a communications interface 524. Communications interface 524 allows software and data to be transferred between computer system 500 and external devices, such as image capturing means 212 and 214. Examples of communications interface 524 can include a modem, a network interface (such as an Ethernet card), a communications port, a PCMCIA slot and card, etc. Software and data transferred via communications interface 524 are in the form of signals which can be electronic, electromagnetic, optical or other signals capable of being received by communications interface 524. For example, signals 262 and 272 are provided to communications interface via a channel 528. Channel 528 carries signals 262 and 272 and can be implemented using wire or cable, fiber optics, a phone line, a cellular phone link, an RF link and other communications channels.

In this document, the terms "computer program medium" and "computer usable medium" are used to generally refer to media such as removable storage device 518, a hard disk installed in hard disk drive 512, and signals provided via channel 528. These computer program products are means for providing software to computer system 500.

Computer programs (also called computer control logic) are stored in main memory 508 and/or secondary memory 510. Computer programs can also be received via communications interface 524. Such computer programs, when executed, enable computer system 500 to perform the features of the present invention as discussed herein. In particular, the computer programs, when executed, enable processor 504 to perform the features of the present invention. Accordingly, such computer programs represent controllers of computer system 500.

In an embodiment where the invention is implemented using software, the software may be stored in a computer program product and loaded into computer system 500 using removable storage drive 514, hard drive 512 or communications interface 524. The control logic (software), when executed by processor 504, causes processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

VIII. Conclusion

While various embodiments of the present invention have been described above, it should be understood that they have been presented by way of example only, and not limitation. It will be apparent to persons skilled in the relevant art that various changes in detail can be made therein without departing from the spirit and scope of the invention. The breadth of the present invention should not be limited by any of the above-described exemplary embodiments, but should be defined only in accordance with the following claims and their equivalents.

What is claimed is:

1. An apparatus for analysis of an object by use of reflected spectral imaging, comprising:

(a) a light source for illuminating the object;

(b) an optical filter disposed in the light path between said light source and the object and which, when illuminated, projects onto the object an image comprising a plurality of areas, each having a different known optical density;

(c) a first polarizer for polarizing light from said light source;

(d) an image capturing module for capturing an image reflected from the object at a depth less than a multiple scattering length, said reflected image traveling along a reflected light path between the object and said image capturing means;

(e) a second polarizer disposed in said reflected light path between the object and said image capturing means, wherein a plane of polarization of said second polarizer is oriented approximately 90° relative to a plane of polarization of said first polarizer;

(f) an image correcting and analyzing module coupled to said image capturing module for correcting and analyzing said reflected image; and (g) a calibration module for measuring the intensity of the light reflected from different points of the image projected by said optical filter onto said object, mapping the measurements to the optical densities known to be present at said projected image, and calibrating the apparatus using the mapping.

2. A system for calibrating a reflected spectral imaging apparatus for analysis of an object, comprising:

(a) means for filtering light where such means, when illuminated, projects onto an object to be analyzed an image comprising a plurality of areas, each having a different known optical density;

(b) means for illuminating said filtering means and said object;

(c) means for measuring the intensity of the light reflected from different points of the image projected by said filtering means onto said object;

(d) means for mapping the light intensity measurements taken at said points, to said optical densities known to be present at said points of the projected image; and (e) means for calibrating the reflected spectral imaging apparatus using the mapping between said light intensity measurements and said known optical densities.

3. The system of claim 2, wherein said image, projected by said illuminating means and said light filtering means, is a well-defined image having a plurality of reference points.

4. The system of claim 2, wherein said image, projected by said illuminating means and said light filtering means, comprises a plurality of concentric rings and a cross at the center of the rings, where the rings and cross each have different known optical densities.

5. The system of claim 2, wherein said image, projected by said illuminating means and said light filtering means, is neutral with respect to optical density for a plurality of wavelengths.

6. The system of claim 2, wherein said light filtering means is located in a probe used to direct light onto the object under analysis.

7. The system of claim 2, further comprising:

(f) means for comparing the current mapping with that of a prior calibration; and (g) means for recalibrating the reflected spectral imaging apparatus in accordance with said current mapping.

8. A system for calibrating a reflected spectral imaging apparatus for analysis of living tissue, comprising:

(a) an optical filter which, when illuminated, projects onto an object an image comprising a plurality of areas, each having a different known optical density;

(b) a light source for illuminating said object; and (c) a calibration module for measuring the intensity of the light reflected from different points of said image projected by said optical filter onto said object, mapping the measurements to the optical densities known to be present at said image, and calibrating the reflected spectral imaging apparatus using the mapping.

9. The system of claim 8, wherein said image, projected by said light source and said optical filter, is a well-defined image having a plurality of reference points.

10. The system of claim 8, wherein said image, projected by said light source and said optical filter, comprises a plurality of concentric rings and a cross at the center of said rings, where said rings and cross all have different known optical densities.

11. The system of claim 8, wherein said image, projected by said light source and said optical filter, is neutral with respect to optical density for a plurality of wavelengths.

12. A method for calibrating a reflected spectral imaging apparatus for analysis of an object, comprising the steps of:

(a) creating an optical filter which, when illuminated, projects onto an object under analysis an image comprising a plurality of areas, each having a different known optical density;

(b) inserting said optical filter in the path of a light source of the apparatus, between said light source and said object under analysis;

(c) illuminating said object under analysis using said light source;

(d) measuring the intensity of the light reflected from different points of said image projected by said optical filter onto said object;

(e) mapping the intensity measurements to said optical densities known to be present at said points of said projected image; and (f) using said mapping to calibrate the reflected spectral imaging apparatus.

13. The method of claim 12, wherein step (a) comprises creating an optical filter which projects a well-defined image having a plurality of reference points.

14. The method of claim 12, wherein step (a) comprises creating an optical filter which projects an image comprising a plurality of concentric rings and a cross at the center of said rings, where said rings and cross all have different known optical densities.

15. The method of claim 12, wherein step (a) comprises creating an optical filter that projects an image that is neutral with respect to optical density for a plurality of wavelengths.

16. The method of claim 12, wherein step (b) comprises inserting said optical filter in a probe used to direct illumination onto the object under analysis.

17. The method of claim 12, wherein step (b) comprises inserting said optical filter at such a location in the path of said light source so as to project a focused image at the plane where imaging is being performed within the object under analysis.

18. The method of claim 12, wherein step (f) comprises the steps of:

(i) comparing said mapping to that of a prior calibration; and (ii) recalibrating the reflected spectral imaging apparatus in accordance with said mapping as necessary.

19. A computer program product comprising a computer usable medium having computer readable program code means embodied in said medium for causing an application program to execute on a computer that calibrates a reflected spectral imaging apparatus for analysis of an object, said computer readable program code means comprising:

(a) a first computer readable program code means for causing the computer to measure the intensity of the light reflected from different points of the image projected by an optical filter onto an object to be analyzed;

(b) a second computer readable program code means for causing the computer to map the light intensity measurements taken at said points to the optical densities known to be present at said points of said projected image; and (c) a third computer readable program code means for causing the computer to calibrate the reflected spectral imaging apparatus using the mapping between said light intensity measurements and said known optical densities.

* * * * *